United States Patent Office 3,225,611
Patented Dec. 28, 1965

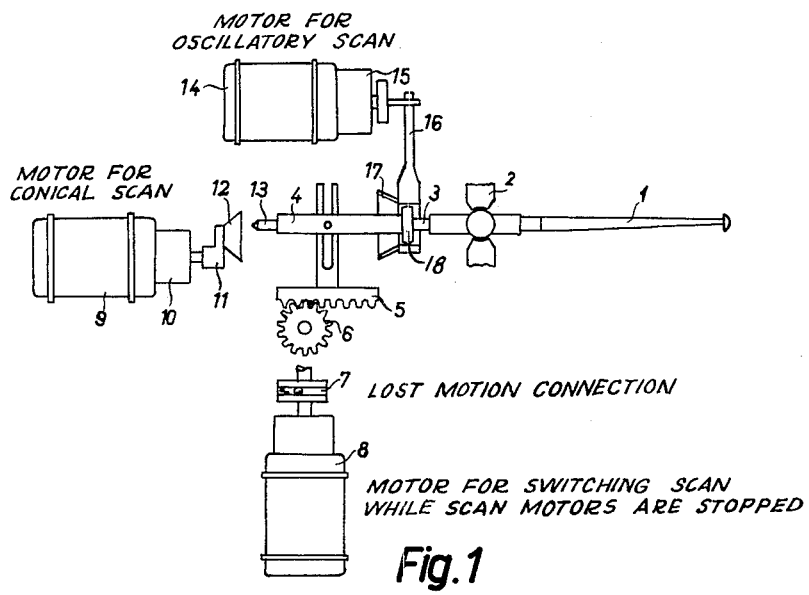
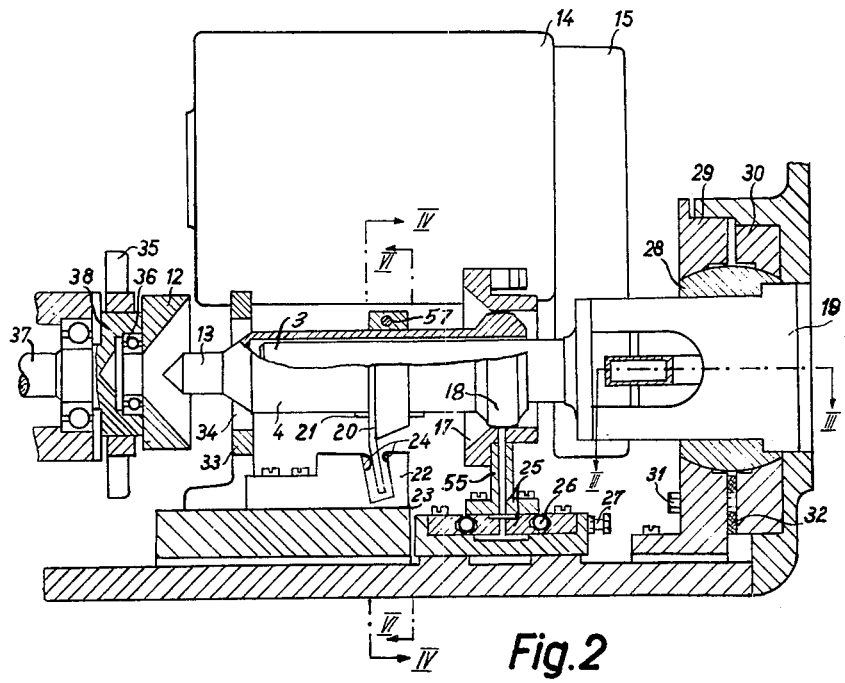

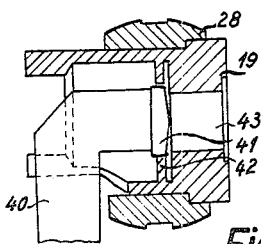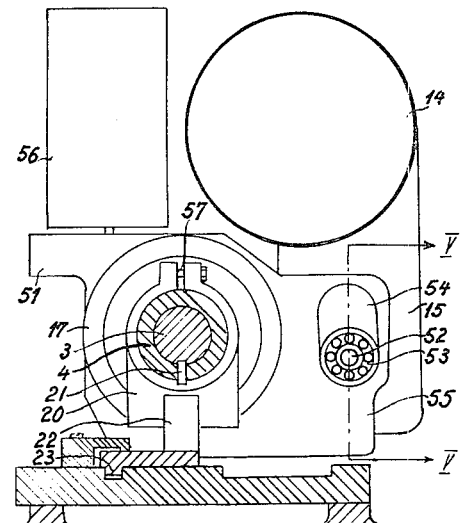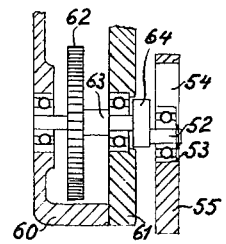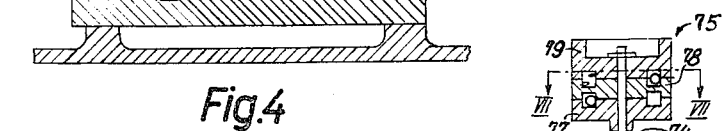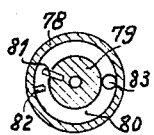

3,225,611
DIRECTIONAL RADAR-ANTENNA DRIVE WITH SELECTIVE COUPLING PERMITTING EITHER CONICAL OR OSCILLATORY SCAN
Jakob Alder, Dietikon, and Louis Reinhard, Zurich, Switzerland, assignors to Albiswerk Zürich A.G., Zurich, Switzerland, a corporation of Switzerland
Filed May 13, 1963, Ser. No. 279,780
Claims priority, application Switzerland, May 25, 1962, 6,345/62
13 Claims. (Cl. 74—86)

Our invention relates to radar directional antennas.

For producing a sharply bunched directional beam which can be directed to any point in space, such antennas generally comprise a primary radiator and a reflector, and are mounted for rotation about a vertical axis and for swiveling about a horizontal axis. In some cases, the radar equipment is rotatable as a unit about a vertical axis, and its directional antenna is tiltable relative to the unit in a vertical plane only.

In addition to affording the antenna to be directed toward a point in space of any azimuth angle and elevation bearing, it is sometimes desirable to impart to the directional beam an additional, usually rapid movement. For example, when automatically tracking a moving object, the directional antenna in most cases is subjected to an additional scanning motion which causes the directional beam to rotate while deflected from the symmetry axis of the reflector. Furthermore, it is under other circumstances desirable in such radar systems to provide for scanning motion limited to a small angle sector in space, when the target data are inaccurate or lacking. Such a superimposed tracking movement can be effected, for example, by rapidly reciprocating the directional beam in a vertical plane while at the same time the azimuth angle of the directional antenna is being changed slowly.

In conjunction with shipboard radar, still another searching movement is often applied. When tracking a vessel, whether for piloting or military purposes, the rotating antenna movement is not sufficient since only the vessel portion of greatest reflectivity action is responded to, thus, it may happen that during a turning maneuver of the vessel its prow wave reflects most strongly; but since after or even during the turning movement of the vessel, the wave disappears, the radar apparatus may lose track of the vessel.

Although directional antenna arrangements are known that employ additional scanning or searching movement of the directional antenna besides the customary azimuthal and elevational bearing movements, they usually combine the two movements of a rotating directional beam in a horizontal plane or in a vertical plane. In order for the rotating directional beam to describe a circle, the speeds of both basic movements must be equal and both driving mechanisms must operate in close synchronism.

Both of the foregoing requirements for effective operation are difficult to achieve mechanically, and furthermore the necessary equipment occupies a great deal of space. In addition, a greater frequency is necessary for rotational scanning movement than for reciprocatory scanning movement in one plane.

It is accordingly an object of our invention to provide a radar-antenna drive apparatus for purposes of the above-mentioned kind that is not affected by the limitations in accuracy inherent in the known apparatus.

Another object of the invention is to provide a radar-antenna apparatus that affords superimposing upon the normal radar-beam motion a rapid scanning movement by employing relatively simple mechanical means.

A further object of the invention is to provide a radar antenna apparatus that affords achieving the foregoing objectives by means of structure having extremely small over-all space requirements.

An additional object of the invention is to devise a radar-antenna control apparatus which will effect rapid superimposed scanning with suitable structure to compensate for the fact that such rotational scanning is normally at a greater frequency than reciprocatory scanning.

With the above and many other related objects in view, and in accordance with our invention, a radar antenna having a primary radiator universally mounted for rotational and swiveling movement, is provided with rotational drive means for imparting rotational movement to the primary radiator, as well as with reciprocating drive means for imparting reciprocatory movement to the primary radiator; and we further provide selectively operable coupling means and appertaining control means for actuating the coupling means to selectively couple the primary radiator with the rotational drive means and the reciprocatory drive means respectively. In addition, mechanical time-delay means are provided between the control means and the coupling means for delaying the actuation of the coupling means by the coupling control means.

According to more specific features of our invention the coupling means is formed by a sleeve received on an end of an elongated extension of the primary radiator and is provided at one end with an external cone and at the other end with an annular enlargement. A dog is fixed to the sleeve and has a projection engaging a recess of a slide forming part of the coupling drive means. When the slide is selectively moved in one or the other longitudinal direction of the sleeve, the sleeve is consequently moved in the same direction. In this manner, the sleeve, which is keyed to the elongated extension of the primary radiator to permit relative sliding movement in the longitudinal direction but prevent relative rotation therebetween, can be moved by the coupling drive means so as to engage the external cone thereon with a larger eccentric internal cone rotated by the rotational drive means, consequently imparting rotational movement to the primary radiating means. When the sleeve is moved in the opposite longitudinal direction the annular enlargement is received in an internal frustoconical member forming part of the reciprocating drive means and reciprocatory movement is consequently imparted to the primary radiating means.

According to further features of our invention, a fixed wave guide has a peak shaped annular portion at one end which is received within a universal ball joint about which the primary radiator rotates and swivels. A wave guide is also located in the movable elongated extension member of the primary radiator and has a flat end opposing the peak end of the fixed wave guide. As the primary radiator reciprocates or swivels about the universal joint, half of the fixed wave guide peak end is parallel to the flat end of the movable wave guide portion leading to the feed element.

The novel features which are considered as characteristic for the invention are set forth in particular in the appended claims. The invention itself, however, both as to its construction and its method of operation, together with additional objects and advantages thereof, will be best understood from the following detailed description of specific embodiments in connection with the accompanying drawings, in which:

FIGURE 1 is a diagrammatic view of an embodiment of the present invention;

FIGURE 2 is an elevational view partly in section and partly broken away of the coupling element and associated structure forming part of the invention;

FIGURE 3 is a sectional view taken along the line III—III in FIGURE 2 in the direction of the arrows;

FIGURE 4 is a sectional view taken along the line IV—IV in FIGURE 2 in the direction of the arrows;

FIGURE 5 is a sectional view taken along the line V—V in FIGURE 4 in the direction of the arrows;

FIGURE 6 is a sectional view taken along the line VI—VI in FIGURE 2 in the direction of the arrows;

FIGURE 7 is a sectional view taken along the line VII—VII in FIGURE 6 in the direction of the arrows.

In the illustrated embodiment of the invention as shown diagrammatically in FIGURE 1, the primary radiator 1 is carried on an elongated extension member or guide pin 3. A coupling element in the form of a sleeve 4 slides on the end portion of the pin 3. The coupling element is controlled by a drive which, as shown schematically in FIGURE 1, comprises a motor 8 with a delay coupling 7, described in greater detail herein below. The rotating drive motion is converted to rectilinear motion by means of a spur gear 6 and a toothed rack 5.

The rotational drive means for imparting rotational movement to the primary radiator 1 includes a motor 9 whose power is transmitted through a transmission 10 to an eccentric 11 which carries an internal cone 12 which is adapted to receive a smaller external cone 13 formed on one end of the coupling element 4. The reciprocating drive means includes a motor 14 whose power is transmitted by a transmission 15 and a cross-feed drive, hereinafter described in greater detail, to an internal frustoconical member 17 which receives an annular enlargement or roller 18 formed at the other end of the coupling sleeve 4. In the diagrammatic view of FIGURE 1, the primary radiator 1 is shown coupled with the reciprocating drive means. To change from reciprocatory scanning to rotational scanning, the motor 14 is first switched off and the motor 8 switched on. The mechanical delay coupling 7 permits the motor 8 to idle for about two rotations so that it starts up easily. By means of the spur gear 6, the rack 5 is shifted to the left as seen in FIGURE 1, and thereby the coupling sleeve 4 is moved out of the internal frustoconical member 17. Consequently, the entire reciprocating drive means 14, 15, 16 as well as the primary radiator 1 are free to swing. Upon further movement of the rack 5, the external cone 13 is frictionally engaged in the internal cone 12 of the eccentric drive 11. By means of a switch (not shown), preferably a microswitch, the motor 8 is then switched off and the motor 9 switched on.

The speed of rotation of the motors 9 and 14, together with the reduction gearing of the transmissions 10 and 15 are so chosen that the eccentric drive 11 has a speed of 30 r.p.m. and the cross-feed drive 16 a speed of about 5 r.p.m. for example.

In FIGURE 2 there is shown the arrangement of the coupling element 4 relative to the internal cone 12 for rotational scanning and relative to the internal frustoconical member 17 for reciprocatory scanning. The coupling element 4 has an external cone 13 at one end and an annular enlargement or roller 18 at the other end. The end portion of the extension member of the primary radiator comprises the guide pin 3 and an antenna coupling 19 which members are securely threaded to one another or joined in any other suitable manner. The coupling sleeve 4 is slidable on the guide pin 3. Shifting of the coupling element 4 is effected by the projection extending from the dog 20 which is secured to the coupling sleeve 4 with a key or cotter pin 21 or by any other means known in the art. A slider 22 for the dog 20 is guided on rails 23. The driving mechanism for the slider 22 is illustrated in FIGURE 6. In order to prevent tilting of projection of the dog 20 which engages a recess in the slider 22, spherical pivots 24 are provided at the upper edges of the recess.

The drive mechanism for the annular enlargement or roller 18 on the sleeve 4 for effecting reciprocatory scanning is transmitted to the internal frustoconical member 17 which is secured to a slider structure 25 as by the screws shown. The slider structure glides on bearings 26. Play in the bearings 26 can be adjusted with an adjusting screw 27. The structure of the reciprocatory drive mechanism itself is shown in FIGURE 4.

The antenna coupling 19 forming part of the elongated extension member of the primary radiator 1 is mounted in a universal ball joint. The ball 28 is press-fitted onto the antenna coupling 19 and slides within a bipartite ball socket 29, 30. By means of screws 31 distributed uniformly about the periphery, any desired clearance in the joint can be adjusted. Lubrication is effected by felt inlays 32 soaked in oil.

To prevent unrestricted movement of the coupling element 4 when it is uncoupled from either the cone 12 or the frustoconical member 17, limiting stop means 33 in the form of a plate is provided having an opening 34 of just sufficient dimension to permit movement of the coupling element 4 in response to both the rotational and the reciprocating drive means.

With regard to the rotational drive means, only that part of the mechanism is shown in the drawing as is necessary for understanding the operation of the coupling element 4, as the rest of the drive mechanism generally known in the art. Between the internal cone 12 and the drive shaft 37 lies an eccentric drive 38 which is provided with a counterweight 35 for dynamic balancing. To achieve good frictional contact between the external cone 13 and the internal cone 12 at the relatively high speed of 1800 r.p.m. at which the eccentric drive 11 may run, a ball bearing 36 is provided having an inner race that forms a sliding fit for the external cone 13.

Visible in the background of Fig. 2 are the motor 14 and the corresponding transmission 15.

Coupling of the high-frequency energy to the primary radiator 1 occurs within the universal ball joint 2. Fig. 3 shows a cross section of the joint at the location where the electric coupling takes place. The antenna coupling 19 which is press-fitted into the ball 28, is formed at one end 43 as a wave guide. The wave guide 40 leading to the transmitting and receiving equipment (not shown) has an annular portion 41 at one end. The annular portion 41 is shaped with a peak at its coupling side, so that during the reciprocatory movement of the primary radiator 1, half of the coupling side of the annular portion 41 is parallel to the wave guide 43. In front of the wave guide 43 there is a flange 42 which serves as support and bearing for the annular portion 41 and at the same time through the spacing between the wave guide 43 and the annular portion 41 serves as means for adjusting the high-frequency energy. As can be seen from Figs. 2 and 3, the guide 40 is not movable with the primary radiator 1 but is received in the antenna coupling 19 through a lateral opening therein. On the other hand, the wave guide portion 43 is movable with the antenna coupling 19.

The drive mechanism for effecting reciprocatory scanning is shown partly in section in Fig. 4. The internal frustoconical member 17 is shown secured on the plate 55 of the cross-feed drive. The plate 55 carries an elongation 51 which is provided with a toothed rack on its rear side (not shown) to transfer the movement to the synchrotransmitter 56. Of the cross-feed driving mechanism, there can be seen in Fig. 4 the drive motor 14, of which only the casing is shown, the transmission 15 and the end of the crankshaft 52 with a ball bearing 53. The plate 55 has an elongated hole in which the ball bearing 53 is received without play in the horizontal direction as shown in Fig. 4. The dog 20 and its projection into the slider 22 which rides on the rails 23 is also visible in Fig. 4. The dog 20 is fastened by a screw 57 to the coupling element 4. The guide pin 3 is secured to the coupling element 4 with the key 21 to prevent relative rotation therebetween.

In FIG. 5 a portion of the transmission 15 is shown in section. The transmission housing comprises a container portion 60 and a cover 61. The gear 62 is driven over a gear train (not shown) from the motor 14 (Fig. 4). A disc 64 is press-fitted on the shaft 63 of the gear 62 and carries the crank shaft 52. The ball bearing 53 mounted on the crank shaft 52 is free to move vertically in the elongated hole 54 as viewed in Fig. 5.

Fig. 6 is a sectional view along the line VI–VI of Fig. 2, omitting the coupling element 4, the guide pin 3 and the dog 20. The rails 23 and the guide slide 22 are shown in this figure. The plate 33 has a cut-out 34 so shaped that the edge thereof serves as a limiting stop for the coupling element 4. The drive for the coupling element 4 is effected over a gear 72 which cooperates with a toothed rack 73 fixed to the rail 23. The drive shaft 74 is coupled to an ordinary motor (not shown) over a mechanical delay coupling 75.

With the aid of Fig. 7, the construction of the delay coupling 75 may be readily understood. The delay coupling comprises essentially three discs 77, 78, 79. In two of the discs 78, 79, which are normally freely turnable on the shaft 74, annular grooves 80 are milled. Similar grooves are also milled in the opposite face of disc 78 and in disc 77, the latter disc being held against relative rotation with the shaft 74 by any suitable means. The grooves 80 are exactly in register when all the discs are assembled as seen in Fig. 6. In the upper coupling portion 79 there is press-fitted a pin 81 and in the lower coupling portion there is press-fitted a pin 82. Though not shown, similar pins are press-fitted in discs 77, 78 to extend into the grooves therebetween. A ball 83 is set into the grooves 80 and is of a diameter that it can roll in the grooves 80. The coupling disc 79 is secured for rotation on the shaft of the ordinary motor (not shown). When the motor is switched on and its shaft begins to turn the coupling disc 79 there is no transmission of torque to discs 77, 78 until at least two revolutions are made by the motor, when the ball 83 is caught between the pins 81, 82 thereby effecting clutch engagement between discs 78 and 79 and similarly, between discs 77 and 78 to actuate the rails 23.

While the invention has been illustrated and described as embodied in a particular radar antenna apparatus, it is not intended to be limited to the details shown, since various modifications and structural changes may be made without departing from the spirit of the present invention and within the scope and range of equivalents of the following claims.

We claim:

1. In a radar-antenna apparatus, in combination, a primary radiator universally mounted for rotational and reciprocatory movement; rotational drive means for imparting rotational movement to said primary radiator; reciprocatory drive means for imparting reciprocatory movement to said primary radiator; coupling means; coupling drive means for actuating said coupling means to selectively couple said primary radiator with said rotational drive means and said reciprocatory drive means respectively; and mechanical means for delaying the actuation of said coupling means by said coupling drive means.

2. In a radar-antenna apparatus, in combination, a primary radiator universally mounted for rotational and reciprocatory movement; rotational drive means for imparting rotational movement to said primary radiator, said rotational drive means including a rotatable eccentric internal cone; riciprocatory drive means for imparting reciprocatory movement to said primary radiator; coupling means operatively connected to said primary radiating means for rotational movement therewith, said coupling means comprising an external cone having an outer dimension substantially smaller than the inner dimension of said internal cone and adapted to be received within an in frictional engagement with said internal cone; coupling drive means for actuating said coupling means to selectively couple said primary radiator with said rotational drive means and said reciprocatory drive means respectively; and mechanical means for delaying the actuation of said coupling means by said coupling drive means.

3. In a radar-antenna apparatus, in combination, a primary radiator universally mounted for rotational and reciprocatory movement; rotational drive means for imparting rotational movement to said plurality radiator; reciprocatory drive means for imparting reciprocatory movement to said primary radiator, said reciprocatory drive means including a reciprocable internal frustoconical member; coupling means operatively connected to said primary radiating means for reciprocatory movement therewith, said coupling means comprising an annular enlargement having an outer dimension smaller than the inner dimension of said internal frustoconical member and adapted to be received therewithin and in frictional engagement therewith; coupling drive means for actuating said coupling means to selectively couple said primary radiator with said rotational drive means and said reciprocatory drive means respectively; and mechanical means for delaying the actuation of said coupling means by said coupling drive means.

4. In a radar-antenna apparatus, in combination, a primary radiator universally mounted for rotational and reciprocatory movement; comprising an elongated extension member having a feed element at one end thereof; rotational drive means for imparting rotational movement to said primary radiator; reciprocatory drive means for imparting reciprocatory movement to said primary radiator; coupling means comprising a sleeve member received coaxially on the other end of the extension member of said primary radiating means, said sleeve member being adapted for sliding in the longitudinal direction of said elongated extention member and constrained against rotary movement with respect to said elongated extension member; coupling drive means for actuating said coupling means to selectively couple said primary radiator with said rotational drive means and said reciprocatory drive means respectively; and mechanical means for delaying the actuation of said coupling means by said coupling drive means.

5. In a radar-antenna apparatus, in combination, a primary radiator universally mounted for rotational and reciprocatory movement having an elongated extension; rotational drive means for imparting rotational movement to said primary radiator; reciprocatory drive means for imparting reciprocatory movement to said primary radiator; coupling means comprising a sleeve member received on and coaxial with one end of the elongated extension of said primary radiating means, said sleeve member being slidable in the longitudinal direction of said elongated extension and constrained against relative rotation with said elongated extension, means provided at one end of said sleeve member for coupling said sleeve member to said rotational drive means, and means provided at the other end of said sleeve member for coupling said sleeve member to said reciprocatory drive means; coupling drive means for actuating said coupling means to selectively couple said primary radiator with said rotational drive means and said reciprocatory drive means respectively; and mechanical means for delaying the actuation of said coupling means by said coupling drive means.

6. In a radar-antenna apparatus, in combination, primary radiating means having an elongated extension; rotational drive means and reciprocatory drive means respectively, said coupling drive means comprising a slide member slidable in a direction substantially paralle to said primary radiating means; coupling means comprising a sleeve member received on and coaxial with one end of the elongated extension of said primary radiating means, said sleeve member being slidable in the longitudinal direction of said elongated extension and constrained against relative rotation with said elongated extension, means provided at one end of said sleeve member for coupling said sleeve member to said rotational drive means, means provided at the other end of said sleeve member for coupling said sleeve member to said reciprocatory drive means, and a projection transversely extending from and secured at one end to said sleeve member, said projection having a free end; coupling drive means for actuating said coupling means to selectively couple said primary radiating means with said rotational drive means and said reciprocatory drive means, respectively, said coupling drive means comprising a slide member slidable in a direction substantially parallel to said sleeve member and formed with a recess in which the projection of said sleeve member is loosely received so that said sleeve member is slidable with said slide member, and means associated with said slide member for sliding said slide member and consequently said sleeve member in a direction to selectively couple said sleeve member to one of said rotational drive means and said reciprocating drive means; and mechanical means for delaying the actuation of said coupling means by said coupling drive means.

7. In a radar-antenna apparatus, in combination, primary radiating means; rotational drive means for imparting rotational movement to said primary radiating means; reciprocatory drive means for imparting reciprocatory movement to said primary radiating means, said reciprocatory drive means comprising a donkey pump mechanism for converting rotary motion to reciprocating motion; coupling means; coupling drive means for actuating said coupling means to selectively couple said primary radiating means with said rotational drive means and said reciprocatory drive means, respectively; and mechanical means for delaying the actuation of said coupling means by said coupling drive means.

8. In a radar-antenna apparatus, in combination, primary radiating means having an elongated extension; rotational drive means for imparting rotational movement to said primary radiating means; reciprocatory drive means for imparting reciprocatory movement to said primary radiating means; coupling means comprising a sleeve member received coaxially on the one end of the elongated extension of said primary radiating means, said sleeve member being adapted for sliding in the longitudinal direction of said elongated extension and constrained against rotary movement with respect to said elongated extension; coupling drive means for actuating said coupling means to selectively couple and uncouple said primary radiating means with said rotational drive means and said reciprocatory drive means, respectively; limiting means for retaining said coupling means within a predetermined path when said coupling means are uncoupled from said rotational drive means and said reciprocatory drive means; and mechanical means for delaying the actuation of said coupling means by said coupling drive means.

9. In a radar-antenna apparatus, in combination, primary radiating means having an elongated extension; rotational drive means for imparting rotational movement to said primary radiating means; reciprocatory drive means for imparting reciprocatory movement to said primary radiating means; coupling means comprising a sleeve member received coaxially on the one end of the elongated extension of said primary radiating means, said sleeve member being adapted for sliding in the longitudinal direction of said elongated extension and constrained against rotary movement with respect to said elongated extension; coupling drive means for actuating said coupling means to selectively couple and uncouple said primary radiating means with said rotational drive means and said reciprocatory drive means, respectively; limiting means for retaining said coupling means within a predetermined path when said coupling means are uncoupled from said rotational drive means and said reciprocatory drive means, said limiting means comprising a plate member having an orifice with a defining edge surrounding said sleeve member; and mechanical means for delaying the actuation of said coupling means by said coupling drive means.

10. In a radar-antenna apparatus, in combination, primary radiating means having an elongated extension; universal ball joint means mounting said primary radiating means intermediate the ends of said elongated extension; rotational drive means for imparting rotational movement to said primary radiating means; reciprocatory drive means for imparting reciprocatory movement to said primary radiating means; coupling means; coupling drive means for actuating said coupling means to selectively couple said primary radiating means with said rotational drive means and said reciprocatory drive means, respectively; and mechanical means for delaying the actuation of said coupling means by said coupling drive means.

11. In a radar-antenna apparatus, in combination, primary radiating means having an elongated extension, means for conveying a high frequency signal through said elongated extension to said primary radiating means, said means comprising a movable wave-guide portion and a fixed wave-guide portion, said movable wave-guide portion being in said elongated extension between said ball joint means and said primary radiating means and said fixed wave-guide portion extending into said elongated extension through an opening therein adjacent said ball joint means on the opposite side of said movable wave-guide means; universal ball joint means mounting said primary radiating means intermediate the ends of said elongated extension; rotational drive means for imparting rotational movement to said primary radiating means; reciprocatory drive means for imparting reciprocatory movement to said primary radiating means; coupling means; coupling drive means for actuating said coupling means to selectively couple said primary radiating means with said rotational drive means and said reciprocatory drive means, resceptively; and mechanical means for delaying the actuation of said coupling means by said coupling drive means.

12. In a radar-antenna apparatus, in combination, primary radiating means having an elongated extension, means for conveying a high frequency signal through said elongated extension to said primary radiating means; hollow universal ball joint means mounting said primary radiating means intermediate the ends of said elongated extension; rotational drive means for imparting rotational movement to said primary radiating means; reciprocatory drive means for imparting reciprocatory movement to said primary radiating means, said fixed wave-guide having a peak shaped end portion and said movable wave guide having a flat end portion adjacent one another within said ball joint means so that half of said peak shaped end portion is parallel to said flat end portion during reciprocatory movement of said primary radiating means; coupling means; coupling drive means for actuating said coupling means to selectively couple said primary radiating means with said rotational drive means and said reciprocatory drive means, respectively; and mechanical means for delaying the actuation of said coupling means by said coupling drive means.

13. In a radar-antenna apparatus, in combination, a primary radiator universally mounted for rotational and reciprocatory movement; rotational drive means for imparting rotational movement to said primary radiator; reciprocatory drive means for imparting reciprocatory movement to said primary radiator; coupling means; coupling drive means for actuating said coupling means to selectively couple said primary radiator with said rotational drive means and said reciprocatory drive means respectively; said coupling drive means including a rotatable shaft and motor means for driving said shaft; and mechanical means for delaying the actuation of said coupling means by said coupling drive means, said mechanical delay means including a plurality of discs coaxially mounted on said shaft and having faces slidably abutting one another, at least one of said discs being held against relative rotation with said shaft and the other of said discs being at least partially rotatable with respect to said shaft, one of said rotatable discs being operatively connected to said motor means, said discs having an annular groove formed in their abutting faces, said annular grooves being in registry with one another, a projection extending transversely to the groove in each of said discs, and a ball member rollable in the annular grooves of the abutting disc faces.

References Cited by the Examiner

UNITED STATES PATENTS

| | | |
|---|---|---|
| 2,543,188 | 2/1951 | Moseley. |
| 2,574,376 | 11/1951 | Childs et al. _____ 343—765 X |
| 2,930,255 | 3/1960 | Bryson _____ 343—757 X |
| 2,945,229 | 7/1960 | Klauser _____ 343—761 X |

ELI LIEBERMAN, *Acting Primary Examiner.*

HERMAN KARL SAALBACH, *Examiner.*